United States Patent [19]
Westerfeld

[11] Patent Number: 5,570,871
[45] Date of Patent: Nov. 5, 1996

[54] DEVICE FOR SELECTIVELY TENSIONING AND CLAMPING STUDS MOUNTED ON A PRESSURE VESSEL TO PERMIT NUTS TO BE TIGHTENED OR LOOSENED

[75] Inventor: Horst Westerfeld, Castrop-Rauxel, Germany

[73] Assignee: Westfalia Nucleartechnik GmbH & Co., Germany

[21] Appl. No.: 402,509

[22] Filed: Mar. 13, 1995

[30] Foreign Application Priority Data

Mar. 16, 1994 [DE] Germany ............... 44 08 873.6

[51] Int. Cl.⁶ ...................................... E21B 19/00
[52] U.S. Cl. ............................ 254/29 A; 81/57.38
[58] Field of Search ................... 29/452; 269/173, 269/174; 254/29 A; 81/57.15, 57.33, 57.38, 90.2

[56]      References Cited

U.S. PATENT DOCUMENTS

| 3,039,741 | 6/1962 | De Mart | 254/29 A |
| 3,664,213 | 5/1972 | Anati | 81/90.2 |
| 3,844,533 | 10/1974 | Markiewicz et al. | 81/57.38 |
| 4,315,446 | 2/1982 | Orban | 81/57.38 |
| 4,433,828 | 2/1984 | Spiegelmann et al. | 254/29 A |
| 4,535,656 | 8/1985 | Orban | 81/57.38 |
| 4,708,036 | 11/1987 | Vossbrink | 254/29 A |
| 5,271,297 | 12/1993 | Heiermann . | |
| 5,330,159 | 7/1994 | Heiermann . | |

FOREIGN PATENT DOCUMENTS

| 2146608 | 3/1973 | Germany . |
| 1444606 | 8/1973 | Germany . |

Primary Examiner—Robert C. Watson
Assistant Examiner—Thomas W. Lynch
Attorney, Agent, or Firm—Samuels, Gauthier, Stevens & Reppert

[57] ABSTRACT

Apparatus for tightening and releasing nuts on screw-threaded studs to fit or release a cover on a pressure vessel employs several devices each for subjecting a respective one of the studs to tension to clamp the stud whilst the nut is rotated thereon. Each device employs a coupling mechanism for clamping a rod-like extension piece in end-to-end relationship to one of the studs to apply tension force thereto from a hydraulic piston and cylinder unit. The coupling mechanism takes the form of a sleeve containing several arcuate coupling segments guided for displacement radially of the stud and its extension piece. Cam surfaces on the coupling segments and the sleeve inter-engage as the sleeve is rotated to effect the displacement of the coupling segments between open and closed positions.

21 Claims, 2 Drawing Sheets

DEVICE FOR SELECTIVELY TENSIONING AND CLAMPING STUDS MOUNTED ON A PRESSURE VESSEL TO PERMIT NUTS TO BE TIGHTENED OR LOOSENED

FIELD OF THE INVENTION

The present invention relates in general to apparatus for securing and releasing nuts on screw-threaded members in order to fit or remove a cover of a pressure vessel. In the case of reactor pressure vessels for nuclear fuels, access for personnel is restricted and hence the apparatus needs to perform its function automatically remote from human operatives. The screw-threaded members are usually engaged in tapped blind bores in the pressure vessel and in order to secure and release the nuts it is necessary to employ a clamping device to subject each of the screw-threaded members to axial tension before the nut thereon is rotated otherwise the rotation of the nut could cause the screw-threaded member to rotate in its blind bore in the pressure vessel.

BACKGROUND TO THE INVENTION

Apparatus and devices of the type with which the invention is concerned are described in U.S. Pat. Nos. 5,271,297 and 5,330,159 both assigned to the same assignee as this application. A tensioning or clamping device is also described in GB 1444606 in which hydraulic piston and cylinder units supported on a carrier ring subject couplings on the screw-threaded members to tensile force. In this arrangement, each of the couplings and the heads of the screw-threaded members have inter-engageable jaws and grooves. The nuts on the screw-threaded members lie beneath the couplings relative to the vessel and are rotated with a special drive having a pinion wheel which can pass through apertures in the carrier ring to mesh with teeth on the nuts. When one of the nuts is connected the drive and is to be rotated an associated piston and cylinder unit is charged with pressure fluid to lift the coupling and brace the screw-threaded member so the nut can be rotated on the screw-threaded member.

In U.S. Pat. No. 5,330,159 to transfer the high forces of hydraulic units to the screw-threaded members in order to tension and stretch them, sleeves or gripper nuts are screwed onto the screw-threaded members as extensions from above the upper end of the members. Screwing and unscrewing the powerful gripper nuts onto and off the ends of the screw-threaded members requires considerable additional energy and has to be carried out by means of special rotary actuators with geared motors.

However, it its also known from DE 2146608 that instead of using hollow gripper nuts solid auxiliary extension elements can be selectively connected to the screw-threaded members by means of external coupling mechanisms, which each have two semi-shell shaped coupling segments screwed onto the ends of the screw-threaded member and the auxiliary extension. The segments are displaced by means of a coupling lock operated by an activating piston and cylinder to lock these elements together positively. Although these devices can be used if the screw-threaded member protrudes with its end over the unscrewed cover-fastening nut only relatively slightly, the coupling mechanism with its coupling lock still takes up a relatively large amount of space. This creates considerable problems especially when the screw-clamping device is used for pressurised reactor vessels as in this case the screw-threaded members have to be arranged at short distances from one another and there is therefore only limited space available for setting up the clamping devices.

The main objective of the invention is to improve the clamping device of the above type in particular with respect to its coupling mechanism, so that very high tensile and clamping forces can also be reliably transferred yet the device is able to have comparatively small dimensions and can also operate with small adjustments on closing and opening.

SUMMARY OF THE INVENTION

According to the present invention there is provided a clamping device for subjecting screw-threaded members to tension to permit the tightening or release of the nuts thereon; said device comprising a rod-like extension element disposable in end-to end coaxial relationship with one of the screw-threaded members; hydraulic means for exerting force on the extension element to tension said one screw-threaded member and a coupling mechanism for selectively coupling the extension element to said one screw-threaded member to transfer the tensioning force therebetween. The coupling mechanism comprises a number of coupling segments disposed around adjacent end regions of the extension element and said one screw-threaded member, means for establishing a positive tension-proof contact engagement between the inner surfaces of the coupling segments and the adjacent end regions of the extension element and said one screw-threaded member and a rotatable actuator surrounding the coupling segments.

The actuator and the coupling segments have co-operating inter-engageable surfaces which upon rotation of the actuator cause the coupling segments to be displaced radially of the common axis of the extension element and said one screw-threaded member between open and closed positions to establish or release the contact engagement. The arrangement and design of the coupling mechanism as a coupling lock having a simple rotational element or coupling sleeve as the actuator is highly advantageous. The coupling of the bolt-shaped extension element with the end of the screw-threaded member and thereby the tension-proof locking of these members is effected by a simple rotary motion of the coupling sleeve. This results in a coupling mechanism which can have small dimensions and makes a compact form for the whole clamping device possible. Only small rotary adjustments are necessary for opening and closing the coupling mechanism, i.e. a rotation of the rotational element about an angle of rotation that can be considerably smaller than a complete rotation. This also results in a precise and reliable coupling device which can be operated by means of a simple rotary drive.

In a preferred embodiment of the invention the coupling device has at least three coupling segments disposed around the common axis encircled by the rotational element. By using three arc-shaped coupling segments an angle of rotation of the rotational element can be used to close and open the coupling device which does not exceed 60°.

The rotational element encircling the coupling segments and the coupling segments of the coupling mechanism are best designed so that when the rotational element is turned the coupling must be either closed or opened, whereby the closing and opening of the coupling can be carried out in counter-rotational movements of the rotational element but also in an unidirectional rotation of the same. In a practical embodiment the rotational element is provided with cams or closing members or closing surfaces which adjust the coupling segments in the closing and opening directions. The closing members or closing surfaces on the inner side of the rotational element and complementary, surfaces on the outer sides of the coupling segments can be made by simple shaped forming of the rotational element and the coupling segments. Preferably, the rotational element or coupling sleeve has locking cams on the inside forming the closing surfaces and the locking cams work with the corresponding flat pressing surfaces of the coupling segments. These locking cams can be formed by local wall thickenings of the rotational element or coupling sleeve preferably by secant wall thickenings of the otherwise cylindrical rotational element or coupling sleeve. The locking cams which can be formed from the simple wall thickening of the coupling sleeve or can be attached to its cylindrical inner define flat closing surfaces each of which is roughly parallel to a tangent on the surrounding area of the coupling ends of the screw-threaded member and the extension element. The arc-shaped coupling segments at both ends relative to the rotation of the coupling sleeve are provided on the outside with flat pressed-out surfaces corresponding to the closing surfaces. The flat surfaces of each coupling segment, which can form edge margins, are interconnected by a circular or arc-shaped outer surface so the coupling segments taper towards the edges with the pressed surfaces. By aligning the inter-engageable surfaces of the segments and the sleeve with the rotation of the coupling sleeve the coupling segments are then forcibly adjusted in the closing and opening directions.

The tension-proof connection of the extension element and the end of the screw-threaded member is achieved by the positive interlocking of these members with the coupling segments of the coupling device in a closed state. Various different interlocking connections are possible. For example, the coupling ends of the member and the extension element can be furnished with ring-shaped channels, annular grooves or the like, and preferably with a group of such channels or grooves whereas the coupling segments are furnished with corresponding ribs or the like which can be inserted into the grooves. The positive coupling forms at the coupling ends of the member and the extension element can also comprise screw-threaded sections whereby the coupling segments each have a corresponding section of counterthread on the periphery so that on closing the coupling device the threaded sections inter-engage and thus form the positive connection.

The rotational element or coupling sleeve preferably joins upper and lower faceplates which are penetrated by the extension element and the end of the screw-threaded member, respectively. The coupling segments are then disposed between the two faceplates and the coupling segments are effectively encased or enclosed in the coupling sleeve and are displaceably supported on at least the lower faceplate.

It is recommended that the rotational element or coupling sleeve is rotatably carried on the faceplate penetrated by the extension element by means of a bearing disposed thereon on a cylindrical mounting surface of the bolt-like extension element.

It is preferred for the coupling segments to be guided in the closing and opening directions. Guide means for this purpose may comprise axial guiding elements attached to the coupling segments and in the form of simple plugs, pins or the like which are guided in segmental guideways in the form of grooves, slots or the like in the faceplates joined to the rotational element or coupling sleeve. The guideways can, at the same time, form an angle of rotation restriction of the rotational element. The guideways are best made slightly arc-shaped or angularly bent to adapt the rotational movement of the coupling sleeve and the radial closing and opening movements of the coupling segments. Preferably, each arc-shaped coupling segment is guided by an associated axial guide element lying axially at its arc centre.

Depending on the application of the screw-clamping device of the invention, a rotary drive, if necessary even a simple manual device with an actuating lever or the like, can be provided for operating the coupling mechanism by rotating its rotational actuator. Preferably, the operation is performed with the assistance of a rotary drive whereby the rotational element is provided with peripheral gearing for engaging a pinion driven by a motor. As only small angles of rotation are necessary for closing and opening the coupling mechanism the peripheral gearing need only extend over a part of the periphery of the rotational element or coupling sleeve. The peripheral gearing is best disposed on one of the faceplates mounted to the coupling sleeve.

The coupling mechanism can be disposed within a supporting member such as in particular, a supporting stand, carrier ring or the like, which serves as the carrier of the hydraulic means arranged above the coupling mechanism acting from below against a shoulder or similar abutment on the upwardly-projecting extension element. On the supporting member or support stand several screw-clamping devices of the type according to the invention each with its own coupling mechanism and hydraulic means can be disposed on the common pitch circle of the screw-threaded members at a set peripheral spacing from one another. Thus it is possible to arrange an individual screw-clamping device according to the invention on the supporting member or carrier ring which can be placed on the vessel cover for each screw-threaded member lying on the common pitch circle.

The invention may be understood more readily, and various other aspects and features of the invention may become apparent, from consideration of the following description.

BRIEF DESCRIPTION OF DRAWINGS

An embodiment of the invention will now be described, by the way of example only, with reference to the accompanying drawings, wherein.

DESCRIPTION OF PREFERRED EMBODIMENT

Figure 1:
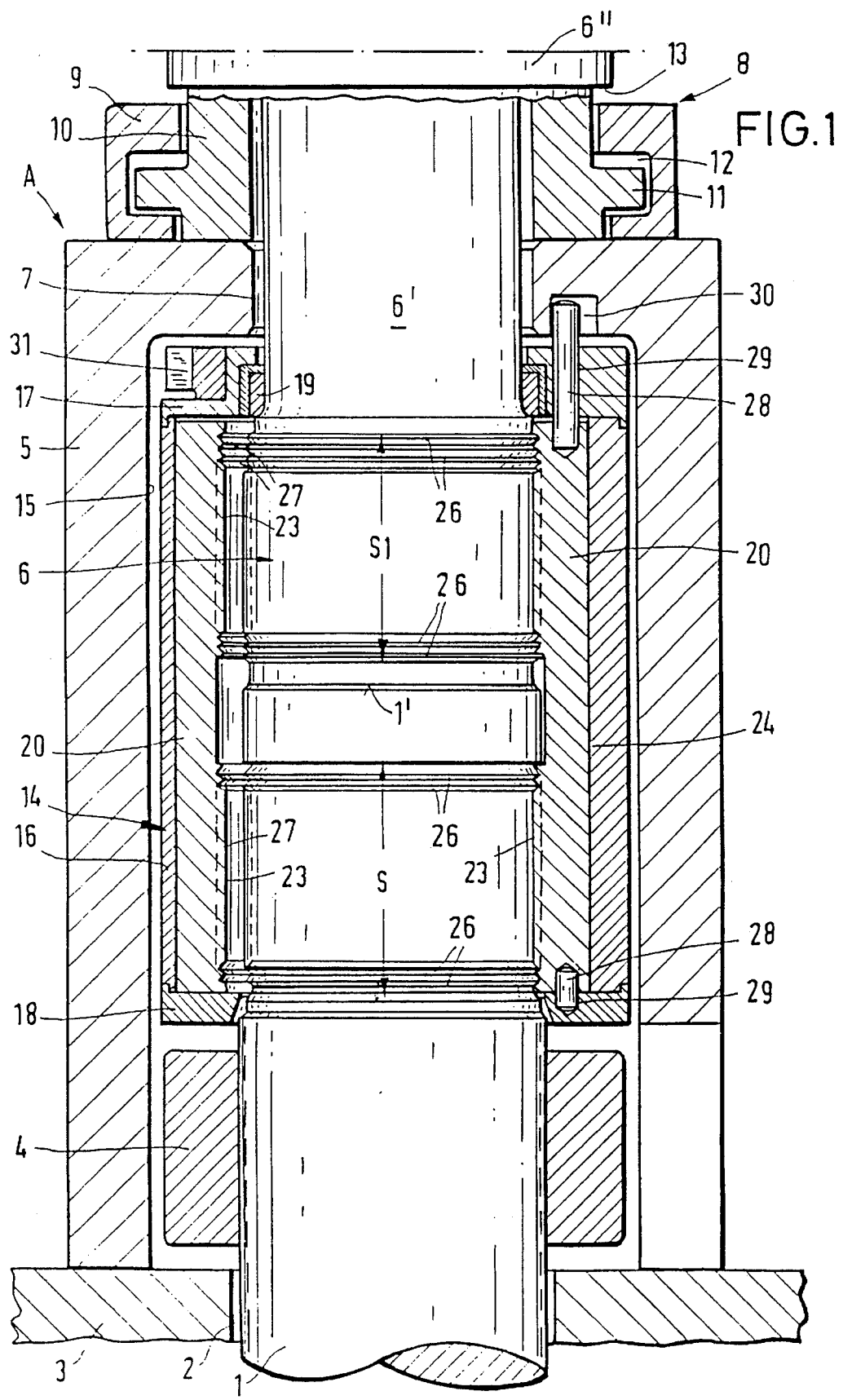
FIG. 1 is a part-sectional representation of a device constructed in accordance with the invention.

FIG. 1 shows a clamping device A of the invention in its working position on a screw-threaded member 1 such as a bolt or stud. The lower unseen end of the member 1 is screwed into a threaded bore, such as a blind bore, in a pressure vessel, particularly a pressure reactor for nuclear fuel. The upper region of the member 1 passes through a bore 2 in the lid flange 3 of a vessel cover closing the vessel. A nut 4 is screwed onto an intermediate threaded section of the member 1 above the flange 3. The clamping device A is constructed in known manner for displacement and employs a support 5 which can be placed onto the vessel cover or its flange 3 from above. In order to tension the member 1 the base of the support 5 engages on the flange 3 as a firm clamping abutment. A base under surface of a bolt-like extension element 6 is placed on the upper end face 1' of the member 1. The element 6 and the member 1 thus extend end-to-end in co-axial relationship. A cylindrical upper portion 6' of the element 6 is of somewhat reduced diameter and is accommodated in a through opening 7 in an upper wall of the support 5. The upper portion 6' of the element 6 joins an enlarged bolt head 6", such as a flange or the like, spaced above the support 5. Between the head 6" and the upper wall of the support 5 there is an hydraulic clamping unit 8 with a cylindrical outer component 9 attached to the upper wall of the support 5. The cylindrical component or ring 9 encircles the portion 6' of the element 6. A further ring-shaped inner component 10 within the component 9 also coaxially encircles the portion 6' of the element 6 and can move to engage the bolt head 6" from below. The inner component 10 has a ring piston 11 which is sealably guided in a working chamber 12 of the cylindrical component 9. By supplying pressure medium to the chamber 12, to apply force to the lower surface of the piston 11 the component 10 can be lifted hydraulically against a shoulder surface 13 of the bolt head 6". The member 1 can thus be subjected to axial tension by the desired amount, provided that the extension element 6 transferring the clamping force of the unit 8 is coupled to the member 1 in a tension-proof manner. The tension-proof coupling between the element 6 and the member 1 is attained by means of a coupling mechanism 14 which is disposed below the hydraulic unit 8 in an inner space 15 of the support 5.

The hydraulic unit 8 is only schematically illustrated in FIG. 1 as it is already well-known for such clamping devices. The unit 8 can also comprise a number of, e.g. two, parallel hydraulic clamping appliances disposed on the opposite sides of the extension element 6 on the support 5. In this case the bolt head 6" forms a so-called pressure bridge on which both hydraulic clamping appliances act. Hydraulic clamping appliances of this kind are generally known, e.g. from U.S. Pat. No. 5,330,159.

The coupling mechanism 14 for the tension-proof coupling of the extension element 6 with the upper end of the member 1 has a rotational actuator in the form of a sleeve 16 rotatable about the common axis of the member 1 and the extension element 6. The sleeve 16 coaxially encircles the coupling ends of the member 1 and the extension element 6 and is connected at the upper and lower end with a ring-shaped faceplate 17, 18. The extension element 6 supports the upper faceplate 17 while the member 1 supports the lower faceplate 18. A bearing ring 19 is positioned in a recess of the upper faceplate 17, by which the sleeve 16 is mounted for rotation about the axis of the member 1 around the abutting ends of the extension element 6 and the member 1. The whole coupling mechanism 14 can be rotatably suspended by the bearing ring 19 on the extension element 6.

The coupling sleeve 16 forms a selective coupling lock with the assistance of which the coupling mechanism 14 can be closed for the tension-proof coupling of the extension element 6 with the member 1 or opened to release the connection. Inside the coupling sleeve 16 there are three identical arcuate coupling segments 20 the bases of which are displaceably supported on the lower faceplate 18. The segments 20 extend up to the upper faceplate 17 allowing for vertical clearance. As shown mainly in FIGS. 2 and 3, the coupling segments 20 each have an arcuate span of roughly 120° or slightly less than 120° in relation to the cylindrical surfaces of the abutting ends of the member 1 and the extension element 6. It can also be seen in FIGS. 2 and 3 that the arc-shaped coupling segments 20 each taper at both edge margins. This can be achieved by shaping the edge margins of the coupling segments 20 with flat pressed-out surfaces 21. The flat outer surfaces 21 of each segment 20 are connected by a central arc-shaped surface 22 which is concentric to the inner arcuate surface 23 of the segment 20. The radius of the inner surface 23 corresponds to that of the cylindrical outer surfaces of the member 1 and the extension element 6.

The coupling sleeve 16 has inwardly projecting locking cams 24 corresponding to the segments 20 on its cylindrical inner surface equidistant from one another, i.e. offset to one another by 120° respectively. The cams 24 have flat closing surfaces 25 parallel to the flat surfaces 21 of the segments 20 in the open position of the coupler (FIG. 2) and each extend along a circular chord parallel to a tangent on the cylindrical surfaces of the coupling ends of the member 1 and the extension element 6. In the embodiment shown, the three locking cams 24 are formed as local secant wall thickenings of the otherwise cylindrical coupling sleeve 16. The arrangement is such that when the coupling mechanism 14 is open (FIG. 2) the arc-shaped coupling segments 20 are supported with their flat surfaces 21 on the closing surfaces 25 of two adjacent locking cams 24. When the coupler is closed (FIG. 3) the segments 20 are supported centrally on the closing surfaces 25 by their arc-shaped surfaces 22 and their inner curved surfaces 23 are firmly connected to the element 6 and the member 1 to effect the tension-proof coupling.

To achieve a more positive connection with the member 1 and the element 6 the inner surfaces 23 of the coupling segments 20 as well as the abutting end regions of the member 1 and the extension element 6 have corresponding interengageable means. In the preferred embodiment shown, the interengageable means comprise a plurality of close parallel grooves which form curved ribs. As shown in FIG. 1, the member 1 has a plurality of such ring-shaped grooves 26 over an axial section S of which only two grooves are shown in the upper and lower regions. Correspondingly, the extension element 6 has an axial section S1 with similar ring-shaped grooves 26. The coupling segments 20 are provided with groups of grooves 27 on their arc-shaped inner surfaces 23 corresponding to the grooves 26. The arrangement is such that when the coupling mechanism 14 is closed (FIG. 3) the groups of grooves 26 and 27 and the ribs formed therefrom mutually engage one another, whereby the coupling segments 20 are positively locked in the axial sense to the coupling ends regions of the member 1 and the extension element 6 and thus the tension-proof positive coupling of the extension element 6 with the member 1 is produced.

The coupling segments 20 are guided by guide means in the closing and opening direction of the coupling mechanism 14 relative to the rotational actuator i.e. the coupling sleeve 16. The guide means comprise axial guiding elements in the form of pins 28 attached to the upper and lower ends of the coupling segments 20 as shown in FIG. 1. The pins 28 can be inserted into and held by blind bores in the coupling segments 20. Two such pins 28 arranged on a common joint vertical axis are assigned to each of the three coupling segments 20, with the pins 28 being disposed at the arcuate centres of the coupling segments 20. The pins 28 of the coupling segments 20 are guided in guideways 29 in the front of grooves or slots which are disposed on both faceplates 17 and 18. The form and course of the guideways 29 can be seen in FIGS. 2 and 3. Here it can be seen that each of the guideways 29 has a slightly curved or bent course whereby one end is at a somewhat larger radial distance from the axis of the member 1 and the extension element 6 than the other. The length of the guideways 29 determines the angle of rotation about which the coupling sleeve 16 can be turned for closing and opening the coupling mechanism 14. In a closed position of the coupling mechanism 14 (FIG. 3) one end of each of the guideways 29 is central of one of the closing surfaces 25 and between the latter and the cylindrical outer surfaces of the member 1 and the element 6, whilst the other end of the guide-way 29 is approximately in the centre between two adjacent locking cams 24 of the coupling sleeve 16 at a somewhat larger radial distance from the member 1 and the extension element 6 than the first-mentioned end of the guideway 29. FIG. 1 show that the upper pins 28 on the coupling segments 20, penetrate through the faceplate 17 and with its upper end reaches into a recess 30 at the underside of the support 5 with radial clearance and thus prevents the coupling segments 20 from rotating.

The coupling mechanism 14 with the coupling sleeve 16 preferably has a rotary drive. For this purpose a peripheral tooth system 31 is disposed on the upper faceplate 17 which extends only over part of the periphery of the coupling sleeve 16. The tooth system 31 can engage with a drive pinion (not shown), with the assistance of which the coupling sleeve 16 can be partly rotated relative to the coupling segments 20 around the common axis of the member 1 and the element 6 to close or open the coupling mechanism 14. The pinion can be driven by e.g. an electrical motor.

Figure 2:
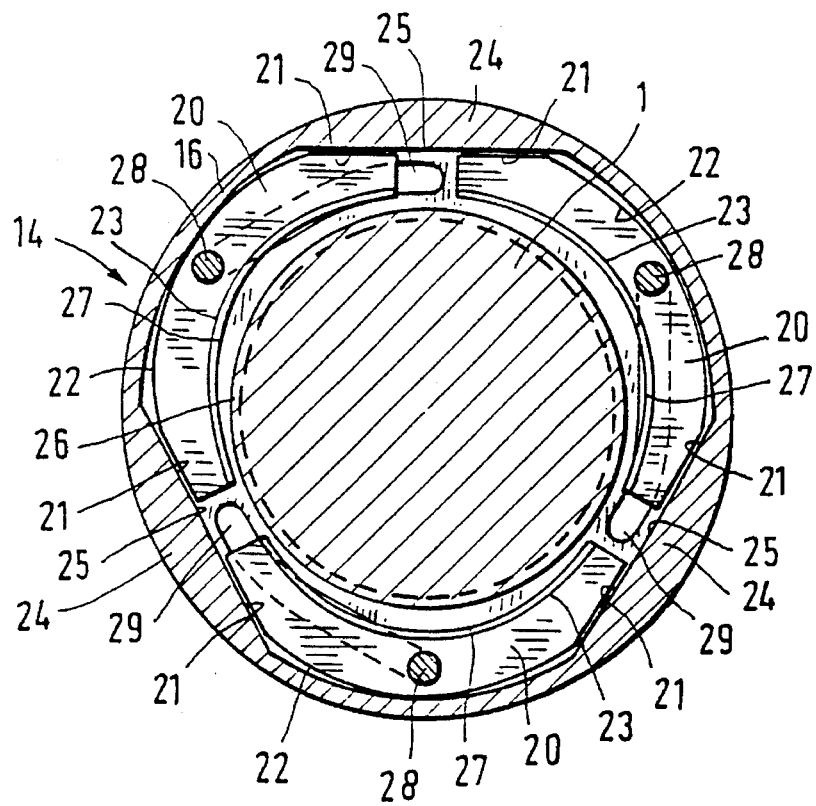
FIG. 2 is a cross-section through the coupling mechanism of the device shown in FIG. 1 in an opened position and FIG. 3 is a cross-section through the coupling mechanism of the device shown in FIG. 1 in a closed position.
Figure 3:
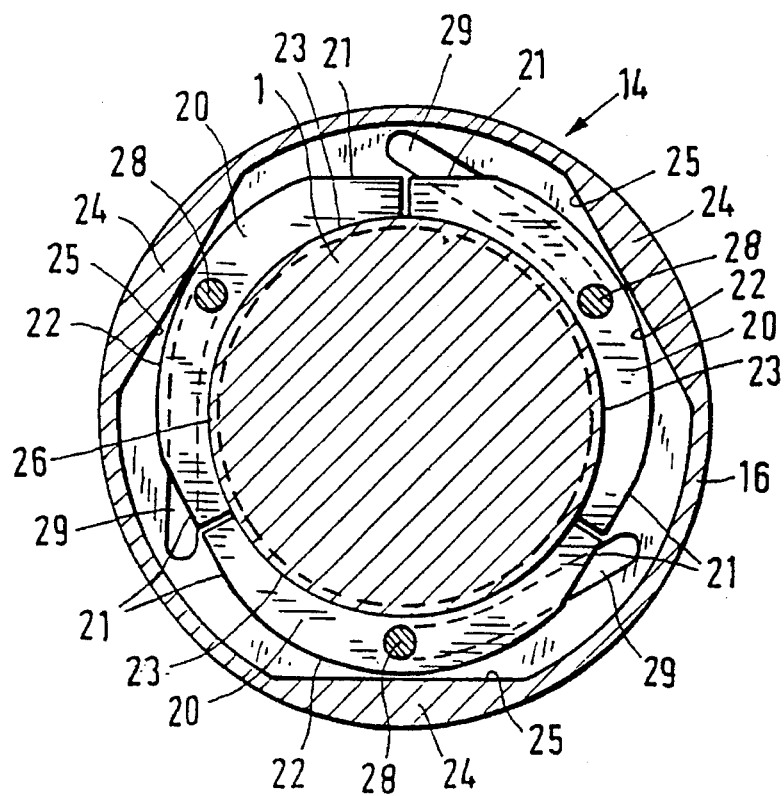

When the coupling mechanism 14 is opened (FIG. 3) the coupling sleeve 16 is in a rotational position in which the coupling segments 20 are set back so far radially in relation to the coupling end regions of the member 1 and the extension element 6 that the grooves 26, 27 for the positive locking do not engage one another and consequently the extension element 6 has no tension-proof connection with the member 1. In order to produce the tension-proof connection, the coupling sleeve 16 is rotated about an angle of about 60° with the assistance of the rotary drive the precise angle being determined by the length of the guideways 29 in relation to the coupling segments 20 in the direction of rotation. The locking cams 24 of the coupling sleeve 16 now slide with their flat closing surfaces 25 over the curved surfaces 22 of the coupling segments 20 to displace the segments 20 inwards against the coupling ends of the member 1 and the extension element 6 and consequently the positive engagement between the grooves 26,27 is established. The closed position of the coupling mechanism 14 is shown in FIG. 3. To open the coupling mechanism 14 it is necessary to either rotate the coupling sleeve 16 in the reverse sense back about said angle of rotation of about 60° or to rotate the sleeve 16 further in the same rotational direction so that the position of FIG. 2 is achieved in which the extension element 6 is released from the member 1.

Of course, the invention is not restricted to the above embodiment and various alterations can be made to the clamping device of the invention. For example, the coupling mechanism 14 may have just two coupling segments 20, or more than three instead of the preferred three coupling segments 20. The positive locking of the coupling segments 20 to the coupling ends of the member 1 and the extension element 6 can also be achieved by means other than the grooves 26 and 27. For example the member 1 and that extension element 6 can be threaded at their coupling ends and the coupling segments 20 are then each provided with a corresponding counterthread which on closing the coupling positively contacts the threaded sections on the member 1 and the extension element 6. It is also possible to form a single groove or relief or the like on the coupling end of the member 1 and/or the extension element 6 which interacts with a corresponding projection on each of the coupling segments 20 to achieve positive locking on closing the coupling mechanism 14 and thus the tension-proof coupling of the extension element 6 and the member 1. In all cases the extension element 6 is connected to the member 1 in a tension-proof manner by means of the coupling mechanism 14, so that the tension force of the unit 8 located above the coupling mechanism 14 is fully effective to stretch and tension the member 1. Once the desired tension has been achieved the nut 4 can be tightened up to the flange 3 whereby the cover can be reliably fixed and clamped. Conversely, the nut 4 can be boxed when the cover is to be released. Usually, several screw-threaded members 1 disposed on a common pitch circle would be provided. It is then possible to arrange several clamping devices A with coupling mechanisms 14 in parallel positions relative to one another on the common support 5 in order to operate on several members 1 at the same time. The supporting member 5 can, as is already known, comprise a carrier ring encircling the pitch circle.

I claim:

1. In an apparatus for use in tightening or releasing nuts engaged on screw-threaded members supported in screw-threaded bores of a vessel in order to secure or release a cover of the vessel, a clamping device for subjecting the screw-threaded members to tension to permit the tightening or release of the nuts thereon; said device comprising a rod-like extension element disposable in end-to end coaxial relationship with one of the screw-threaded members; hydraulic means for exerting force on the extension element to tension said one screw-threaded member and a coupling mechanism for selectively coupling the extension element to said one screw-threaded member to transfer the tensioning force therebetween; wherein the coupling mechanism comprises a number of coupling segments disposed around adjacent regions of the extension element and said on screw-threaded member, means for establishing a positive tension-proof contact engagement between the inner surface of the coupling segments and the adjacent end regions of the extension element and said one screw-threaded member and a rotatable actuator including a coupling sleeve surrounding the coupling segments, the coupling sleeve being connected to upper and lower faceplates through which the extension element and the one screw-threaded member extend, the coupling segments being disposed between the faceplates, the coupling sleeve and the coupling segments having co-operating interengageable surfaces which upon rotation of the actuator cause the coupling segments to be displaced radially of the common axis of the extension element and said one screw-threaded member between open and closed positions to establish or release the contact engagement.

2. A device according to claim 1, wherein that the rotatable actuator has locking cams on its inner side forming part of the inter-engageable surfaces.

3. A device according to claim 1, wherein there are at least three coupling segments.

4. A device according to claim 1, wherein the means for establishing the contact engagement comprise at least one ring-shaped circular or arc-shaped groove and a projection or rib.

5. A device according to claim 1, wherein the means for establishing the contact engagement comprise screw threads.

6. A device according to claim 1 wherein the interengageable surfaces include locking surfaces formed by secant wall thickenings of the coupling sleeve.

7. A device according to claim 6; wherein the locking surfaces are generally flat with each locking surface being parallel to a tangent to the outer surface of the one screw-threaded member and the extension element and the coupling segments each have flat outer surfaces at both their end regions relative to the axis of rotation of the sleeve corresponding to the locking surfaces of the sleeve and a central curved outer surface joining the flat outer surfaces.

8. A device according to claim 1, wherein the sleeve is rotationally mounted on the faceplate penetrated by the extension element by means of a bearing located on a portion of the extension element.

9. A device according to claim 1, and further comprising guide means for guiding the radial displacement of the coupling segments.

10. A device according to claim 9, wherein the guide means comprises axial guiding elements fixed to the coupling segments which engage in segmental guideways in the form of grooves or slots, the guideways serving to restrict angular rotation of the actuator.

11. A device according to claim 1, and further comprising guide means for guiding the displacement of the coupling segments, the guide means comprises axial guiding elements fixed to the coupling segments which engage in segmental guideways in the form of grooves or slots in at least one of the faceplates, the guideways serving to restrict angular rotation of the actuator.

12. A device according to claim 11, wherein the guideways are disposed in both faceplates and the guiding elements on both ends of each coupling segment confronting the faceplates.

13. A device according to claim 12, wherein the guiding elements are disposed at the arcuate centres of the coupling segments.

14. A device according to claim 1, wherein the actuator is displaced by means of a rotary drive.

15. A device according to claim 14, wherein the rotary drive comprises a motor and the actuator is connected with a peripheral tooth system engaging a pinion driven by the motor.

16. A device according to claim 15, where the peripheral tooth system only extends over a part of the actuator.

17. A device according to claim 1, and further comprising a peripheral tooth system on the outside of one of faceplates and a drive engaged with the tooth system to effect rotation of the actuator.

18. A device according to claim 1, wherein the coupling mechanism is arranged within a support and the hydraulic means is arranged above the support acting from below against an abutment on the extension element which projects upwardly through the support.

19. Apparatus according to claim 18 wherein several clamping devices are provided and the devices are disposed on a common pitch circle of the vessel cover where a number of equally spaced screw-threaded members are located.

20. A device according to claim 1, wherein means is provided for effecting locking of the coupling segments.

21. A device according to claim 18, wherein an axial guiding element of each coupling segment is locked by being radially moved in a recess of support.

* * * * *